United States Patent [19]

Ueda et al.

[11] 4,170,339
[45] Oct. 9, 1979

[54] ANALOG DISPLACEMENT TYPE ELECTROMAGNETIC VALVE

[75] Inventors: Yasukiyo Ueda; Keijiro Mori; Keiichi Mori; Takashi Tanahashi; Shigeru Shirai, all of Osaka, Japan

[73] Assignee: Matsushita Electric Industrial Company, Osaka, Japan

[21] Appl. No.: 785,773

[22] Filed: Apr. 7, 1977

[30] Foreign Application Priority Data

Apr. 8, 1976 [JP] Japan ................................ 51/40010

[51] Int. Cl.² .................... F16K 31/06; H01F 7/13; H01F 7/14
[52] U.S. Cl. .................................. 251/138; 251/129; 335/279; 335/281
[58] Field of Search ................ 251/129, 138; 335/279, 335/281

[56] References Cited

U.S. PATENT DOCUMENTS

| | | | |
|---|---|---|---|
| 3,210,041 | 10/1965 | Mitts | 251/138 |
| 3,435,395 | 3/1969 | Rosenberg et al. | 335/279 X |
| 3,768,772 | 10/1973 | Vischulis | 251/129 |
| 3,805,204 | 4/1974 | Petersen | 335/258 X |
| 3,861,641 | 1/1975 | Moffatt | 251/129 X |

FOREIGN PATENT DOCUMENTS 452691  8/1936  United Kingdom ..................... 335/281

Primary Examiner—Arnold Rosenthal
Attorney, Agent, or Firm—Lowe, King, Price and Becker

[57] ABSTRACT

An electromagnetic valve comprises a magnetic circuit formed by a stationary core and a movable core, or armature pivoted at one end of the stationary core and rotatable continuously between first and second positions with a free end positioned in opposed relation to the other end of the stationary core with an air gap therebetween. The armature is spring biased so as to remain in the first position and carries a valve head for engagement with a valve seat. The opposing ends of the stationary and movable cores are so shaped as to form in the air gap a first working section in which the main magnetic flux generates a vector component transverse to the length of the armature and a second working section in which the main magnetic flux generates a vector component parallel to the length of the armature. The resulting vector makes the angular displacement of the armature linearly proportional to the supply current.

13 Claims, 14 Drawing Figures

ANALOG DISPLACEMENT TYPE ELECTROMAGNETIC VALVE

BACKGROUND OF THE INVENTION

1. Field of the Invention

The present invention relates generally to electromagnetic valves, and in particular to an analog displacement type electromagnetic valve.

2. Description of the Prior Art

Analog displacement type electromagnetic valves find use in applications where the amount of controlled fluid is to be proportional to the amount of input current resulting from an input signal. However, it has been difficult to provide a valve capable of providing, at a reasonable cost, a desired degree of proportionality with a fast response characteristic to the input signal.

In a prior art analog displacement type electromagnetic valve as disclosed in Japanese Utility Model No. Sho 45-13723, a plunger having a tapered section near its end is longitudinally movably disposed within a hole of a stationary core. Bias is provided for the plunger in opposition to magnetic attraction generated by excitation of the core and the plunger with a coil mounted in a space therebetween. A first air gap is formed between the opposite end of the plunger and a first working surface formed at the center axis of the stationary core opposite to the core hole and a second air gap is formed between the tapered section of the plunger and the core hole. The attractive force that produces the longitudinal displacement of the plunger is inversely proportional to the square of the spacing of the first air gap. The spacing of the second air gap increases in proportion to the amount of plunger longitudinal displacement to add a corresponding amount of magnetic resistance to the magnetic circuit formed by the core and the plunger so as to compensate for the tendency of the longitudinal force to increase toward the first air gap. Although linear proportionality is provided, the magnetic flux in the second air gap generates a lateral force which causes the plunger to become transversely misaligned from the center axis of the core hole if the valve is not precisely machined. Misalignment of the plunger brings it into contact with the wall of the core hole, so friction prevents continuous movement of the plunger as a function of input current. Furthermore, the prior art valve requires a substantial amount of power because of the low operating efficiency for a given number of coil ampere-turns.

SUMMARY OF THE INVENTION

An object of the present invention is to provide an improved analog displacement type electromagnetically operated valve which is reliable in operation and requires fewer ampere-turns for a given amount of fluid controlled.

Another object of the invention is to provide an improved electromagnetic valve which is capable of providing a desired degree of linear proportionality at a reasonable cost.

A further object of the invention is to provide an improved electromagnetic valve which is capable of responding quickly to the variation of input signal, and is simple in construction.

The present invention contemplates a proportional electromagnetic valve having a pivoted armature or a movable core member rotatable about a pivot formed at one end of a stationary core member on which an excitation coil is wound, the other end of the stationary core being disposed with an air gap from a free end of the movable core member to form a magnetic circuit. According to the invention, opposing ends of the stationary and moving core members of the magnetic circuit are shaped so as to form in the air gap a first or horizontal working section in which the main magnetic flux produces a vector component that is transverse to the length of the armature to pull it toward the stationary core and a second or vertical working section in which the main magnetic flux produces a vector component that is longitudinal to the length of the armature. The resultant vector pulls the armature in linear proportional relation to the input excitation current. The armature carries thereon a valve head such that the angular displacement of the armature moves it with respect to a valve seat to regulate the amount of fluid.

BRIEF DESCRIPTION OF THE DRAWINGS

These and other objects, features and advantages of the present invention will be understood from the following description taken in conjunction with the accompanying drawings, in which.

DESCRIPTION OF THE PREFERRED EMBODIMENTS

Figure 1:
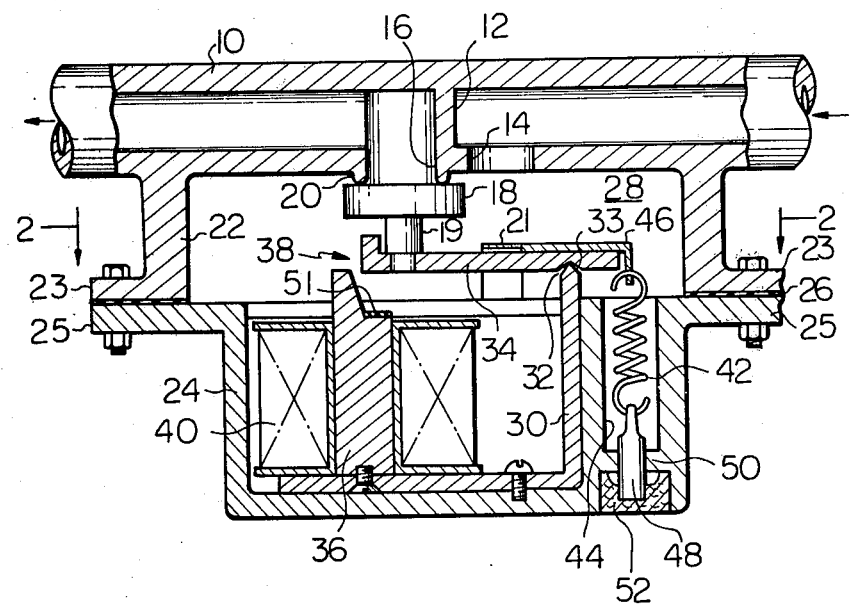
FIG. 1 is a cutaway view of an analog displacement type electromagnetic valve of the invention.
Figure 2:
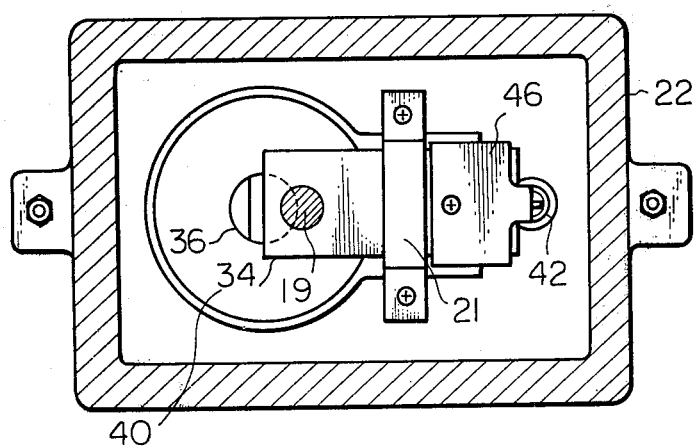
FIG. 2 is a cross-sectional view taken along the lines 2—2 of FIG. 1.

In FIGS. 1 and 2 is illustrated an analog displacement type electromagnetic valve embodying the present invention. The valve is shown as constructed integrally with a pipe 10 through which gaseous fluid is allowed to pass in a direction as indicated by the arrows in FIG. 1. The interior of the pipe 10 is separated by a wall 12 into inlet and outlet sides. Adjacent to opposite sides of the separating wall 12 are formed an inlet opening or port 14 and an outlet port 16. The outlet port 16 is formed with a valve seat 20 which is shown as engaged with a disc-like member or valve head 18.

The pipe 10 is integrally formed with a downwardly extending member 22 which serves as an upper housing section for housing the components of the valve as well as for passing fluid through the inlet and outlet ports and formed with flanges 23. A lower housing section is provided by a vessel 24 formed with flanges 25 secured to flanges 23 of the upper housing section with a sealing member 26 therebetween to provide a fluid-tight sealed chamber 28 which permits the fluid to pass through the inlet and outlet openings 14 and 16 when the valve head 18 is disengaged from contact with the valve seat 20. On the bottom wall of the housing 24 is secured an L-shaped ferromagnetic stationary core member 30 having a knife-edge portion 32. A movable core member or armature 34 is pivoted with a recess 33 on the knife-edge 32 so as to be rotatable between a first position in which the valve head 18 is engaged with the valve seat 20 to close the fluid passage and a second position in which the valve head is disengaged therefrom to fully open the passage.

To the horizontal section of the L-shaped core member 30 is secured a vertical cylindrical core member 36 which extends to a position adjacent to the free end of the armature 34 with an air gap 38 therebetween to form a magnetic circuit. A coil 40 is wound on the core section 36 to produce a force of attraction in the air gap 38.

The armature member 34 is urged in a clockwise direction by coiled spring 42 connected at one end of the armature by means of an aluminum hook 46 secured to the armature 34 and at the other end to an adjustable hook 48 threaded into a bottom wall section 50. The hook 48 permits adjustment of the spring tension to provide appropriate counter-acting force in opposition to the magnetic force so that when the coil is not energized the valve head 18 is urged against the valve seat 20. Sealing is provided beneath the hook 48 by means of a curable sealing agent 52 which is applied after the adjustment is made.

In order to confine the magnetic flux generated in the magnetic circuit, the lower housing section 24 is formed of a non-ferromagnetic material, such as aluminum, and the vertical section of the L-shaped core member is magnetically isolated from the spring 42 by a wall 44 formed integrally with the housing 24.

The valve head 18 is formed with a cylindrical shank 19 which is threaded through the armature 34 adjacent to the free end thereof. A stopper 21 is bridged over the armature 34 to prevent it from being dislocated from the pivot edge 32 before the vessel 24 is secured to the upper housing member 22.

Figure 3:
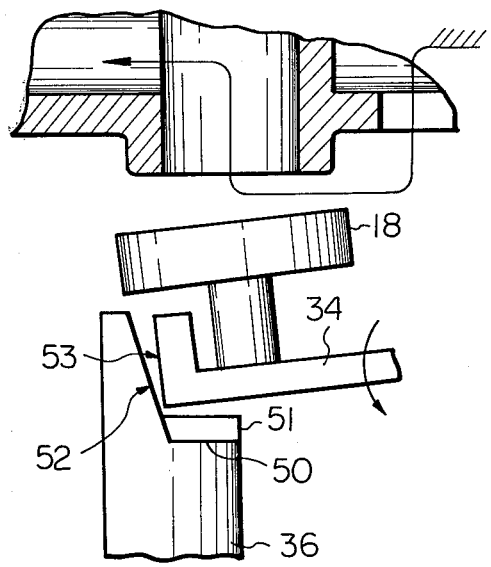
FIG. 3 is an enlarged view of a part of the valve of FIG. 1.

As clearly illustrated in FIG. 3, the upper end of the core 36 is recessed to form a first working surface 50 and a second working surface 52 which is skewed at slightly greater than 90° to the working surface 50. The working surface 50 is substantially parallel to the lower working surface of armature 34 when the valve head is in the fully closed position. A stopper 51 of plastic, or non-ferromagnetic material is disposed on the working face 50 to prevent hysteresis action of the core 36 as the current is reduced from the maximum operating value. Additionally, the free end of the armature 34 is upwardly bent at right angles to its length to form a vertical working surface 53.

When the supply current for coil 40 is zero, the valve head 18 is forced into pressure contact with valve seat 20 by the spring 42 to close the inlet port 14 as shown in FIG. 1. With an increase in the supply current, the core 36 is magnetized with a resultant increase in magnetic attraction of the core acting on the armature. The armature 34 is pulled downward in opposition to the spring 42 to disengage the valve head 18 from pressure contact with the valve seat 20, thereby allowing a passage of gaseous fluid through the inlet and outlet ports as indicated by the arrow in FIG. 3.

Figure 4A:
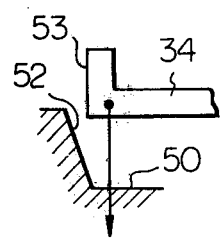
FIGS. 4a and 4b are schematic illustrations useful for describing the operation of the invention.
Figure 4B:
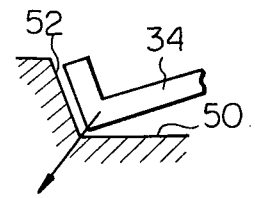

The magnetic flux between the working surface 50 and the lower surface of the armature 34 accounts for a substantial part of the attraction and causes the armature to tend to be nonlinearly, or discretely attracted in much the same way as the action of the armature of an electromagnetic relay when the current increases above a threshold level. On the other hand, the pulling force between the working surfaces 52 and 53 can be resolved into horizontal and vertical vector components with the former much greater than the latter. The working surface 52 is so skewed as to increase its opposing area to the working surface 53 and to decrease the minimum spacing therebetween with the angular displacement of the armature 34 from the closed position. The horizontal vector component on the working surface 53 increases with the angular displacement of armature 34. Therefore, at the free end of the armature there occurs a combined effect of vertical and horizontal vector components acted upon by the working surfaces 50 and 52, respectively. It will be appreciated that with the increase of energization current, the resultant vector will be in the vertical direction at the initial stage of displacement and rotated clockwise as the displacement increases as indicated by the arrows in FIGS. 4a and 4b. The inclination of the working surface 52 relative to the vertical and its configuration can be chosen to linearize the angular displacement in relation to the amount of supply current.

Since the armature 34 is pivoted at one end about a knife-edge section 32 (minimum friction) and the attractive force is exerted on its free end, the valve of the invention is sensitive to the variation of magnetic flux and also capable of responding to a slight amount of flux variation.

The non-magnetic provision of the stopper 51 prevents the armature 34 from operating in a hysteresis loop as described previously and thus permits the quantity of fluid to be decreased linearly from the full open position as it is increased from the closed position.

Figure 5:
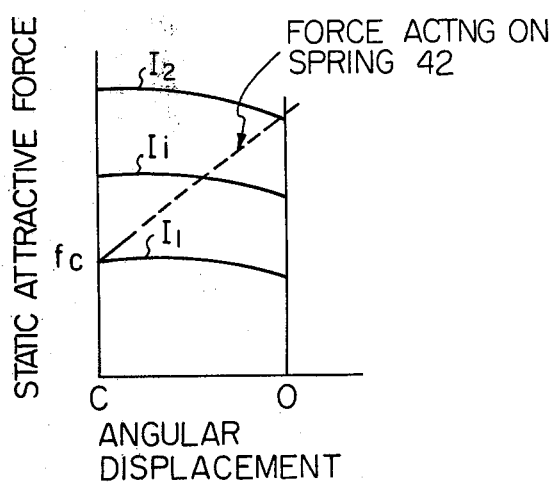
FIG. 5 is a graphic illustration showing the relationship between the angular displacement and the static attractive force between the armature and stationary core.

In FIG. 5, the relationship between angular displacement of the armature and its static attractive force is shown by curves for different amounts of supply currents as parameters. As shown, the static force is substantially flat over the range of angular displacement from the closed position "C" to the open position "O" for currents $I_1$ and $I_2$, where $I_1$ is the amount of current needed to balance against the spring force $f_o$ when the valve is closed and $I_2$ is the current needed to fully open the valve. Flat curves have also been obtained for different current values between the values of $I_i$ and $I_2$ (only a typical current value $I_1$ is shown in FIG. 5). The force acting on the spring 42 is linear in relation to the angular displacement as indicated by broken lines.

Figure 6:
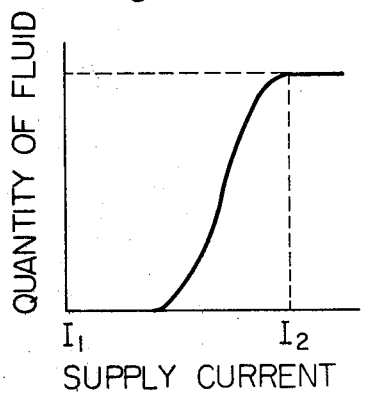
FIG. 6 is a graphic illustration showing the relationship between the supply current and the quantity of fluid controlled.

FIG. 6 depicts the relationship between the quantity of fluid and the amount of control current. As will be noted, the quantity of fluid varies almost linearly over the range of currents from $I_1$ to $I_2$.

The relationship between the quantity of fluid and the supply current can be made to conform to a desired characteristic by modifying the working faces of the core and the armature.

Figure 7:
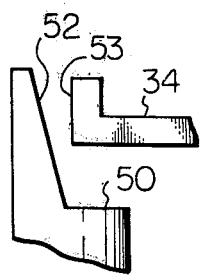
FIGS. 7 to 11 are modifications of the embodiment of FIG. 1.

In the modification of FIG. 7 the length of the working surface 52 of the core 36 is increased such that the working face 53 of the armature 34 is in a position to face the opposing surface 52 when the valve is closed; thereby, the horizontal attractive force is relatively large at the instant the valve is about to be opened.

Figure 8:
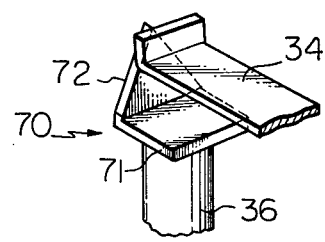

A further modification of FIG. 1 is shown in FIG. 8 in which the horizontal and vertical working surfaces 50 and 53 of the previous embodiment are provided by a separate member 70 which is bent at right angles to form a flat section 71 secured to the end of the core 36 and a vertical section 72 of triangular shape. The triangle section 72 provides an increase in the horizontal vector component as the angular displacement of armature 34 increases. For simplicity, the stopper 51 is omitted.

Figure 9:
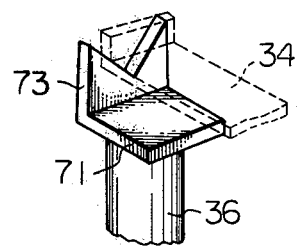

Alternatively, the vertical working surface may be provided by forming a triangular cutout in a vertical member 73 in a manner as illustrated in FIG. 9 such that the interacting surfaces of the member 73 and the armature 34 increases with its downward angular displacement.

Figure 10:
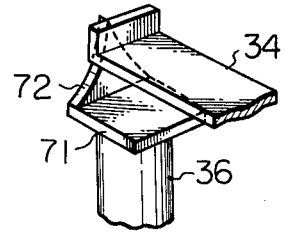

The degree of linearity of the controlled fluid quantity can be improved by a modification as shown in FIG. 10 in which the sides of the triangular member 72 are concave.

Figure 11:
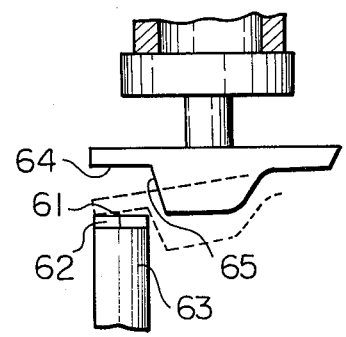

Since the operating characteristic of the armature 34 is determined by the relative dimensions, shapes and angles of the working surfaces of the interacting elements of the armature and the core, it will be appreciated that the relation between the interacting working surfaces of FIG. 1 can be reversed in a manner as illustrated in FIG. 11. As illustrated, the core 36 is provided with a horizontal working face 61 on which the stopper 62 is secured and a vertical working face 62. The armature 34 has its free end formed to provide a horizontal working face 64 to interact with the working face 62 and a skewed working face 65 which interacts with the vertical working surface 63.

It may be appreciated that the linear characteristic and the fast response capability of the valve are combined to provide an advantageous effect in that a small variation of input signal can be sensed to effect corresponding linear increment of the fluid quantity. This is particularly important for applications where various input variables are detected from various sources and combined into a single output signal, which is used to control the amount of a fluidic flow.

Figure 12:
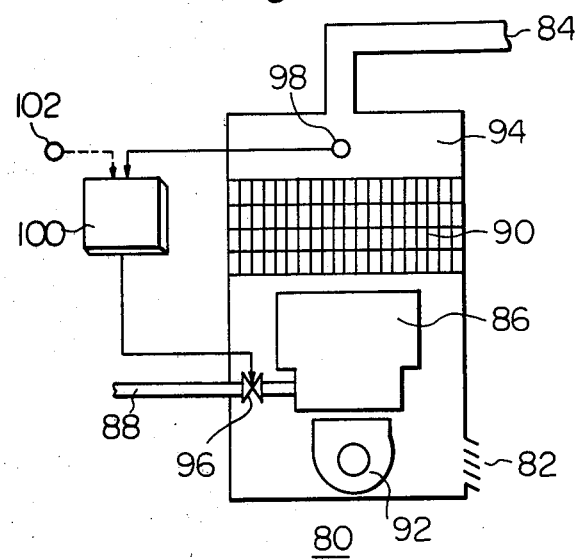
FIG. 12 illustrates an arrangement in which the electromagnetic valve of the invention is employed to demonstrate its advantages.

In an arrangement shown in FIG. 12, the electromagnetic valve of the invention was used to demonstrate its advantages. The arrangement of FIG. 12 is an air heating system comprising a gas furnace 80 for warming cool air taken through an inlet port 82 and supplying the warmed air through a duct 84 to places to be heated. The gas furnace 80 includes a burner 86 supplied with a flow of gas though an inlet duct 88 to warm a heat exchanger 90. The outside cool air is inducted by a fan 92 and sent through the heat exchanger 90 to a plenum chamber 94.

The electromagnetic valve of the invention shown at 96 is interposed in the gas supply duct 88. In the plenum chamber 94 is placed a temperaure sensor or thermistor 98 which is connected to a control circuit 100 which supplies a control current to the valve 96. To the control circuit 100 is also connected another thermistor 102 which is located in a place to be heated.

Figure 13:
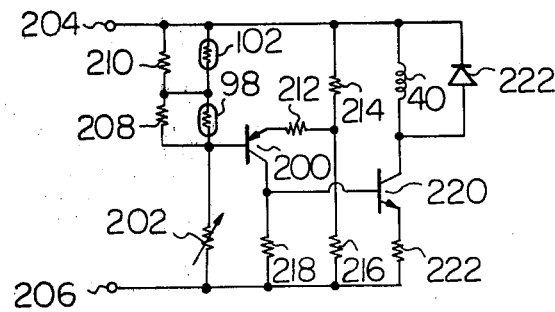
FIG. 13 is a detailed circuit diagram of the control circuit used in the arrangement of FIG. 12.

Details of the control circuit 100 are shown in FIG. 13. In FIG. 13, the thermistors 98 and 102 are connected in series with a variable temperature setting resistor 202 between bias terminals 204 and 206, with resistors 208 and 210 connected in parallel with thermistors 98 and 102, respectively. The base electrode of a transistor 200 is connected to the junction of resistor 202 and thermistor 98. The emitter electrode of transistor 200 is connected by a resistor 212 to a junction between resistors 214 and 216 which are series connected between the bias terminals 204 and 206. The collector electrode of the transistor 200 is connected to bias terminal 206 by a resistor 218. The collector electrode of the transistor 200 is also connected to the base electrode of a transistor 220, having an emitter electrode connected to bias terminal 206 by a resistor 222. The coil 40 of the electromagnetic valve 96 of the invention is connected between the collector of transistor 220 and bias terminal 204, with a diode 222 connected in parallel with the coil 40.

Transistor 200 operates as a comparator to deliver an output voltage across the load resistor 218 in response to a comparison between the potential at the junction of resistor 202 and thermistor 98 and the potential at the junction of resistors 214 and 216, the latter serving as a reference level. When the two potentials are equal, there is no output and thus coil 40 is not energized and gas is not supplied. Temperatures at both plenum chamber 94 and the air-conditioned place are detected by thermistors 98 and 102, respectively. A deviation of temperatures at the sensed points causes the corresponding thermistors to vary in resistance values to change the potential at the base of transistor 200 from the reference level and cause the transistor 200 to deliver a corresponding collector current through resistor 218. The voltage across resistor 218 is amplified by transistor 220. Coil 40 is energized by the collector current of transistor 220. Diode 22 provides a short circuit path for counter-e.m.f. which is generated by a sudden change in the current supplied from transistor 220.

The potential at the base of transistor 220 thus represents a combined input signal of the two control variables. The valve 96 is controlled by the combined input signal to regulate the gas flow supplied to the burner 86 to compensate for the temperature variations.

With the use of valve of the invention, the temperature within the plenum chamber 94 was maintained substantially constant over a wide range of varying loads.

What is claimed is:
1. An electromagnetic valve comprising:
a stationary magnetic core member having first and second mutually angled straight pole face surfaces;
a movable magnetic core member disposed in opposed relation to said stationary core member and pivoted at one end so as to be rotatable between first and second positions and having a free end with first and second mutually angled straight pole face surfaces which confront the first and second mutually angled straight pole face surfaces of the stationary core member forming first and second air gaps;
means for urging said movable core member toward said first position;
means for magnetizing said stationary and movable core members to produce a force acting on said movable core member to rotate the movable core member toward the second position;
said first air gap being formed between the first pole face surface of said stationary and movable core members to provide a first working section for generating a transverse vector component of said force, said first air gap decreasing with the angular movement of said movable core member from said first position to increase said transverse vector component of said force;
said second air gap being formed between the second pole face surfaces of said stationary and movable core members to provide a second working section for generating a longitudinal vector component of said force, said second air gap decreasing with the angular movement of said movable core member from said first position to increase said longitudinal vector component of said force, the effective confronting area of said second working section increasing with the angular movement of said movable core member from said first position to increase said longitudinal vector component of said force; and means coupled to one of the core members for forming a fluid passage such that the amount of the passing fluid is proportional to the angular displacement of said movable core member from said first position.

2. An electromagnetic valve as claimed in claim 1, wherein said movable core member comprises an elongated member formed with a transverse recess therein and said stationary core member is formed with a knife-edge section with which said transverse recess of the elongated member is engaged, so that said movable core member is rotatable about said knife-edge section.

3. An electromagnetic valve as claimed in claim 1, wherein said urging means comprises a coiled spring connected at one end to said movable core member, further comprising an adjustable screw connected to said coiled spring to adjust the force of said coiled spring.

4. An electromagnetic valve as claimed in claim 1, wherein said means for forming a fluid passage comprises a conduit having first and second openings separated by a wall, a valve seat formed with one of said first and second openings, a valve head mounted on said movable core member for engagement with said valve seat when said movable core member is in said first position, and a housing for providing a fluid-tightly sealed chamber to permit said fluid to pass through said first and second openings when said valve head is disengaged from contact with said valve seat.

5. The electromagnetic valve of claim 1, wherein one of the angled pole face surfaces of the stationary core member is disposed at an acute angle to one of the angled pole face surfaces of the movable core member while the fluid passage is closed and the other angled pole face surfaces of the stationary and movable core members are parallel to each other while the fluid passage is closed, the one and other angled members on one of the cores forming first and second working sections of the air gap.

6. An electromagnetic valve as claimed in claim 5, wherein said second working surface is inclined such that the minimum spacing between said second working surface and said movable core member decreases with the angular displacement of said movable core member from said first position.

7. An electromagnetic valve as claimed in claim 6, wherein said first and second working surfaces are at an angle slightly greater than 90 degrees.

8. An electromagnetic valve as claimed in claim 5, wherein said second working surface is formed so the area thereof increases as the angular displacement of said movable core member increases from said first position.

9. An electromagnetic valve as claimed in claim 5, wherein said first and second working surfaces are formed in said stationary core member.

10. An electromagnetic valve as claimed in claim 5, further comprising a non-ferromagnetic member disposed on said first working surface.

11. The valve of claim 1 wherein the first pole face surfaces are arranged so that the magnetic flux lines produced by the magnetizing means between the pole face surfaces are resolved into first and second right-angled components, the first component being much greater than the second component, the first pole face surface of one of the core members being skewed relative to the first pole face surface of the other core member so that there is an increase in the area of the confronting first pole face surface of the one core member and a decrease in a minimum spacing between the two first pole face surfaces as the movable core member is pivoted toward the stationary core member and there is an increase of the first component as the movable core member pivots away from the first position.

12. The valve of claim 11 wherein the first pole face surfaces are arranged so that the first and second components are combined with a flux component in the second direction between the second pole face surfaces of the movable and stationary cores while the valve is closed.

13. The valve of claim 12 wherein the second pole face surfaces are parallel to each other while the valve is closed, the first pole face surface on one of the core members being at right angles to the second pole face surface of the one core member, the first pole face surface of the other core member being at an acute angle to the second pole face surface of the other core member.

* * * * *